United States Patent [19]

Ask

[11] 4,453,437

[45] Jun. 12, 1984

[54] CUTTING TOOL HAVING MEANS FOR HEATING A WORKPIECE

[76] Inventor: Jonas W. Ask, Skogsvägen 10, S-183 52 Täby, Sweden

[21] Appl. No.: 373,708

[22] Filed: Apr. 30, 1982

Related U.S. Application Data

[63] Continuation-in-part of Ser. No. 237,978, Feb. 25, 1981, abandoned, which is a continuation-in-part of Ser. No. 160,177, Jun. 17, 1980, abandoned.

[30] Foreign Application Priority Data

Jun. 20, 1979 [SE] Sweden .................... 7905412

[51] Int. Cl.³ .................. B27B 5/00; B27B 33/00
[52] U.S. Cl. ........................... 83/171; 83/170; 83/835; 144/364
[58] Field of Search ............... 83/16, 171, 835, 170; 219/68, 69 R, 69 E, 70; 409/136, 249; 144/364

[56] References Cited

U.S. PATENT DOCUMENTS

| 2,667,557 | 1/1954 | Herzog | 219/68 |
| 2,719,902 | 10/1955 | Flynn | 219/69 E |
| 4,095,078 | 6/1978 | Waenerlund et al. | 219/68 |

FOREIGN PATENT DOCUMENTS 313429 11/1969 Sweden .
324226 9/1979 Sweden .

Primary Examiner—James M. Meister
Attorney, Agent, or Firm—Burns, Doane, Swecker & Mathis

[57] ABSTRACT

A cutting tool has a plurality of cutting teeth. An electric voltage is applied between adjacent teeth so that a localized heating of the workpiece occurs at and around the cutting tips, in order to facilitate the cutting step. The voltage may be varied in such manner as to prevent or induce non-linear cutting.

9 Claims, 8 Drawing Figures

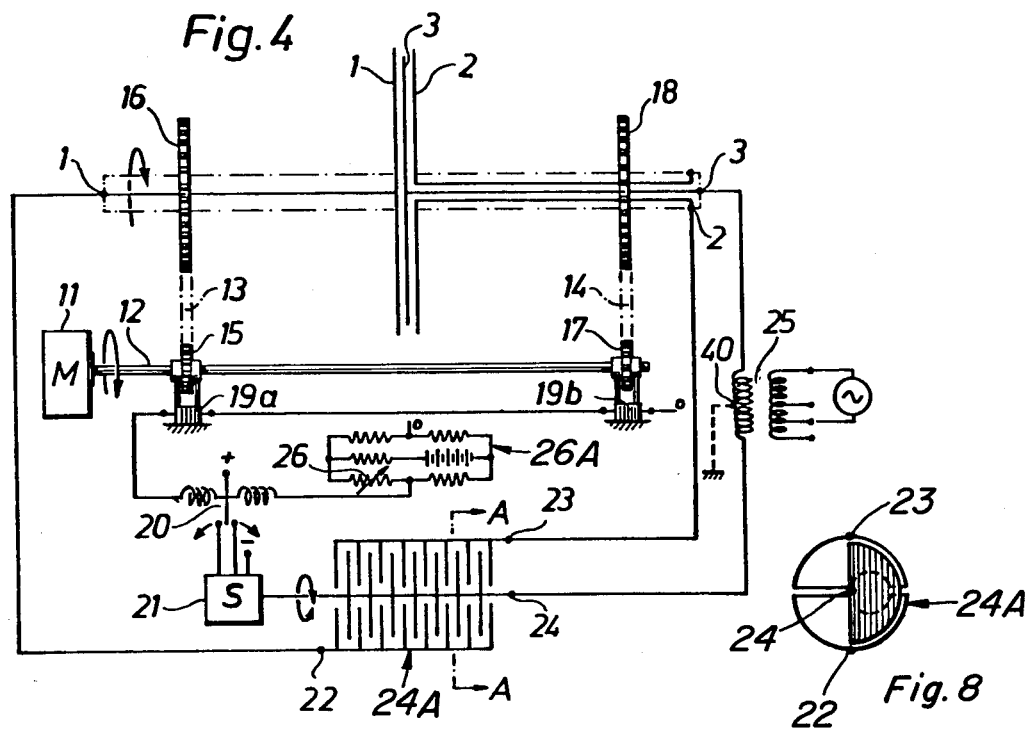
Fig. 4
Fig. 8
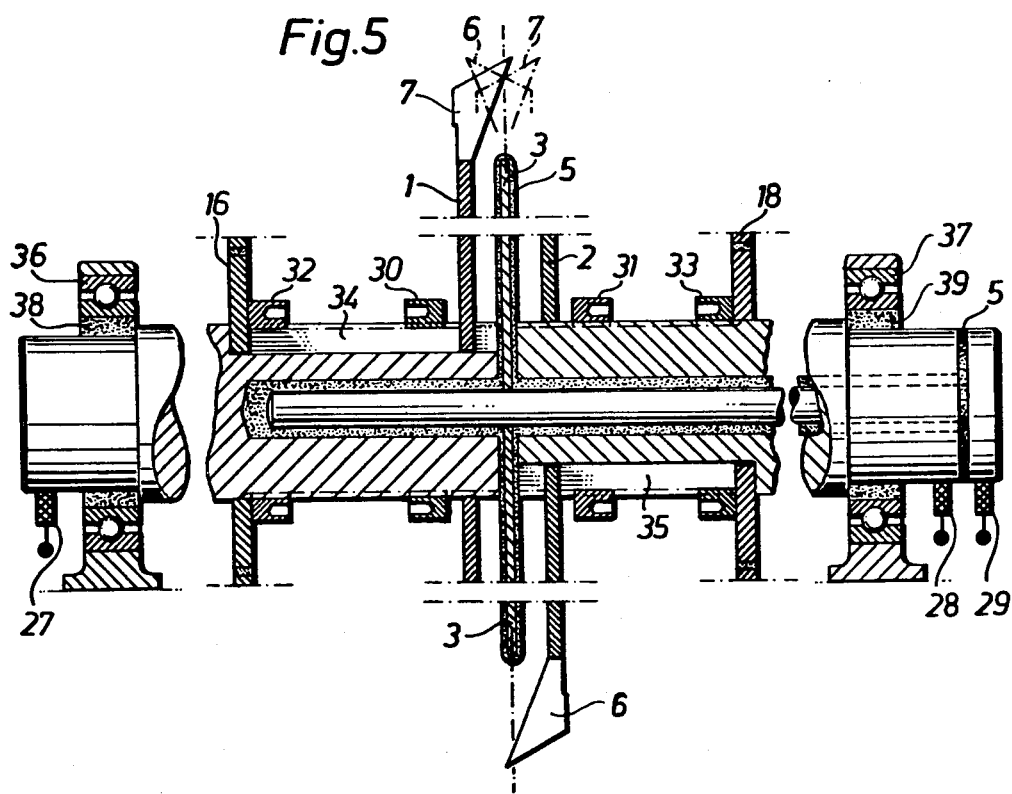
Fig. 5

CUTTING TOOL HAVING MEANS FOR HEATING A WORKPIECE

RELATED APPLICATIONS

This is a continuation-in-part of U.S. Ser. No. 37,978 filed Feb. 25, 1981, now abandoned, which, in turn, is a continuation-in-part of U.S. Ser. No. 160,177 filed June 17, 1980, and now abandoned.

BACKGROUND AND OBJECTS OF THE INVENTION

The present invention relates to the cutting of materials and, in particular, to cutting tools.

When cutting different materials, for example wood, by means of cutting tools capable of sawing, planing, and milling, etc., it has been possible to facilitate the cutting work and increase production by heating the material.

The cost for heating will be dependent to some extent on the needed temperature increase and, as a rule, to even a greater extent on the size of the workpiece. Usually, the larger workpieces are to be heated to facilitate cutting of one single cut through the piece. Further, this heating is done by time-consuming convection and conduction. As a result, it is only for certain special purposes that the heating technique has been suitable for applications such as veneer lathing, for example. Here, heating is necessary so that the wood can be cut and at the same time, the total heating will be well utilized. The larger part of the whole-heated woodmass will then be cut. Another purpose for the heating technique is the sawing of frozen wood.

According to the invention, an effective heating of only the actual area being cut is achieved. The heating is carried out by electric means and is confined at the cutting wedge tip and influences only the small part of the material (wood) that will be cut. On other large parts of the material which shall not be worked on, no energy is wasted.

The saw blade or the circular saw is preferably made of two parts with insulation therebetween. The saw blades are connected to an electrical voltage so that between the wedges, or between them and a third electrode, a heavy field strength is created, resulting in a strong local heating of the workpiece in the vicinity of the wedge-tips.

The saw can be of a conventional type with fixed teeth or ones which are mutually movable as described in Swedish Patent Application No. 7905412-8. The invention can also be applied to knives which are spread apart and insulation is arranged between the parted units. In the case where there are two knife-blades as described in Swedish Pat. Nos. 313,429 and 324,326, the insulation is applied between the knives. If the material in the workpiece has a high electrical conductivity, for example metal, the heating current is produced by ohmic resistance, from a suitable DC-source or AC-source with low frequency. When working on material with low conductivity, for example wood, plastics, etc., the energy is applied dielectrically with high frequency. The heat is concentrated in the cutting area of the material partly due to the sharp wedges and partly because the distance between electrically cooperating teeth is short. Areas with a greater distance from the wedges thus will not be even slightly heated.

The fronts of the teeth are preferably formed in the same manner as described in the above-mentioned Swedish Patent Application No. 7905412-8. The saw blades shall have equal tooth-pitch and the teeth in the saw blades shall have front faces or edges so oriented that the blades are pressed together by shear forces. This is achieved in that the teeth in the left blade (seen in the sawing direction) has a front directed towards and acting to the right at the grip in the wood and that the teeth in the right blade has a front directed to and acting to the left at the grip in the wood.

The active cutting tools thus can steer the cut to the right or the left. A similar steering effect can be achieved by the present invention by an appropriate distribution of the heating of the saw cut so as to facilitate cutting by one or the other of the blades. This is done by introducing a third electrical system and a varied voltage feeding to the two saw blades. The aforementioned right/left forces are influenced by the above-mentioned electrical voltage feeding due to the changed cutting resistance created by the heating.

THE DRAWING

The objects and advantages of the invention will become apparent from the following detailed description of preferred embodiments thereof, in connection with the accompanying drawings in which like numerals designate like elements, and in which:

FIG. 4 is a schematic view of a cutting tool installation with still another type of electric circuit connected thereto;

FIG. 5 is a side elevational view, partly in longitudinal section, of a cutting tool installation according to the present invention;

FIG. 8 is a cross-sectional view taken along line A—A of FIG. 4.

DETAILED DESCRIPTION OF PREFERRED EMBODIMENTS OF THE INVENTION

Figure 1:
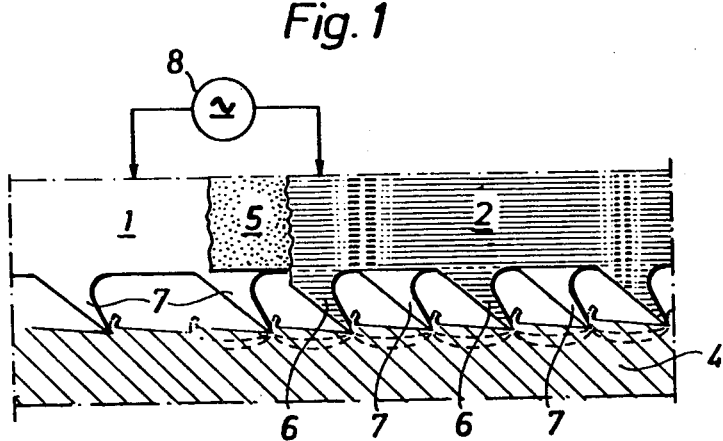
FIG. 1 is a side elevational view of a cutting tool. One type is employing axially-adjacent circular saw blades, with a portion of one blade broken away to reveal electric insulation between the blades, and with electric current being depicted in broken lines within the workpiece being cut.
Figure 2:
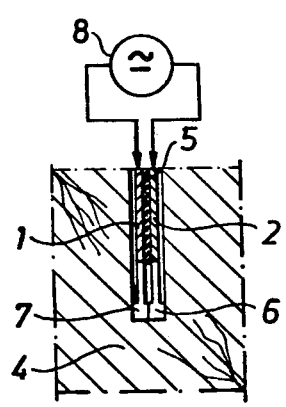
FIG. 2 is a cross-sectional view through a workpiece, depicting the front of the cutting tool of FIG. 1.

An embodiment of the invention pertaining to sawblades is shown in FIG. 1. The sawblades 1 and 2 are mutually isolated electrically from each other by a suitable electrical insulation material 5. Thus, the sequential teeth 6, 7 are electrically isolated from each other. The blades 1 and 2 are provided with opposite electrical polarity by means of a circuit which includes a power source 8. When the tooth-tips penetrate the workpiece 4 there will occur a strong electric field between sequential wedge-shaped teeth, i.e., in the general direction of cutting, as depicted in FIG. 1. The electrical current lies along the shortest path between mutually nearby teeth with opposite polarity. From the figure it is also clear that the electrically-generated heat production will be greatest immediately adjacent the wedge tips.

If the material in the workpiece has a high electrical conductivity, for example metal, the heating current is produced by ohmic resistance, from a suitable DC-source or AC-source with low frequency. When working on material with low conductivity, for example, wood, plastics, etc., the energy is applied dielectrically with high frequency. The heat is concentrated in the cutting area of the material partly due to the sharp wedges and partly because the distance between electrically cooperating teeth is short. Areas with a greater distance from the wedges thus will not be even slightly heated.

Figure 3:
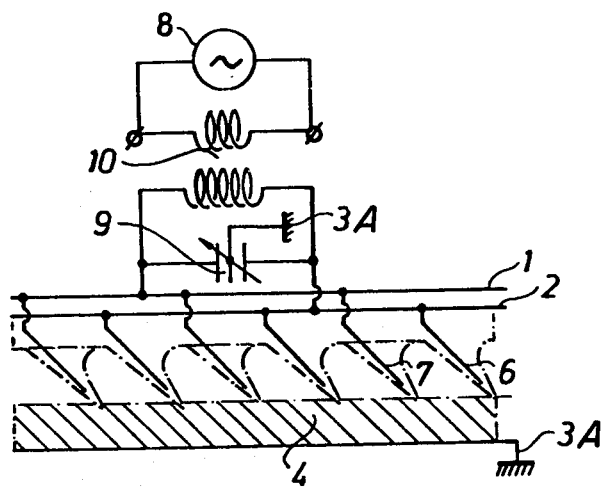
FIG. 3 is a schematic side view of the cutting tool depicting an alternate type of electric circuit connected thereto.

FIGS. 3, 4, and 5 show various embodiments wherein it is possible to balance or mutually vary the heat production at the two groups of the wedge teeth. This is done by introducing a third electric pole 3A grounded to the machine as shown in FIG. 3.

FIGS. 4 and 5 show that a mid-part 3 containing the isolation layer 5 can be arranged as a third pole. In FIGS. 4 and 5, an embodiment of a circular saw is shown in which a 3-pole system with controllable voltage between the poles is used. This voltage control is adjusted in response to the shear force variation between the right-hand teeth 6 and left-hand teeth 7, or by means of a saw-stearing control program of a coumputer.

As shown in FIG. 4, the poles 1, 2, and 3 have been electrically isolated from each other in that the conductor or pole 3 lies between the surrounding sawing poles 1 and 2 and is, in turn, surrounded by the insulating layer 5. The manner in which this isolation is achieved and how an electrical outer contact is arranged with the poles is demonstrated by FIG. 5, which will be described later in detail.

The saw blades 1 and 2 are driven synchronously by a motor 11 (FIG. 4). This occurs via a drive shaft 12, a pair of chain transmissions 13 and 14, and a pair of gear system 15–18. At least two of the gears 16, 18 are electrically isolated from the sawing units 1 and 2, as depicted in FIG. 5.

Even if the saw blades are driven synchronously, a relatively and small internal free-wheeling will be allowed and facilitated. This is done by covering one of the contact surfaces between the electrodes 1 and 3 with suitable grease so as to transfer the unequal shearing forces of the teeth to each chain-transmission. The gears 15 and 17, and their bearings are mounted to the machine frame by two conventional electrical pulling-force sensors 19a and 19b. These sensors are responsive to the shearing forces on the blades and are connected electrically in series and sensitivity-adjusted so that the resultant signal voltage will be zero when the shearing-forces on the blades 1, 2 are equal. The needed amplitude for the above-mentioned free-wheeling is determined by the elasticity of the force sensors and can, with suitable choice of sensors, be kept very small.

The manner in which this force-difference signal can be used to restore the force differences to zero or nearly zero is depicted in the lower part of FIG. 4. That is, an ideal straight sawing direction occurs in the absence of unequal side forces on the saw blades. In the event that unbalanced forces occur, the result electrical signal influences, via a bi-polar relay 20 (functioning as an electro-magnetic switch), the direction of the rotation of a servo-motor 21. The output shaft of the motor turns the mid-electrode 24 of a variable double capacitor 24A (see also FIG. 8) which electrically is isolated from the servo-motor.

The mid-electrode is connected to the mid-pole 3 in the saw blade system via an inductor which is inductively coupled to an adjustable power-generator. As the output shaft of the motor 21 turns, the relative heating of the blades 1, 2 is changed depending upon the direction and extent of the rotation.

The outer electrodes 22 and 23 of the double capacitor are connected via sliding contacts 27 and 28 (FIG. 5) to the saw blade units 1 and 2, respectively. The connection is so chosen that the voltage-unbalances in the 3-electrode system are creating unbalanced heating effects in the blades 1, 2 to rebalance the shearing forces imposed upon the blades. That is, as the blades are subjected to unequal shearing forces which could turn the saw from its intended direction, the sensing system 19a, 19b, 20, 21 varies the heating of the blades to equalize the shear forces and prevent such misdirection.

By suitable forming of the outer electrodes 23, 22 of the double capacitor 24A in FIG. 4 (shown in the cross-section of FIG. 8), and/or its mid-electrode 24 (shaded in FIG. 8), the total capacitance of the system can be kept constant. When constructing a self-oscillating power generator this achieves a practically constant generator frequency.

It is also possible to vary the conditions at the relay 20 in order to create a desired steering of the blades. This is achieved by connecting a bridge circuit 26A to one side of the relay 20. An adjustable resistor 26 of the grounded electrical bridge-system 26A will influence the voltage of relays in the bridge circuit. The bridge voltage can be deviated from a zero value to an arbitrary plus or minus value. The servo-system automatically adjusts in accordance with the characteristics of the relay 20 to achieve a desired shear force distribution among the blades, i.e., an assymetrical cutting relationship, to achieve curved sawing, compensation of an unequal teeth-wear, etc.

In FIG. 5 there are depicted the 3-pole system 1, 2, and 3, its outer electrical contact system 27, 28, and 29, and the two driving gears 16 and 18. For clarity, the 3-pole system is separated. Further, only one section part of the saw blades with its inclined teeth has been shown. These details are also discussed in the above-mentioned Swedish Patent Application No. 7905412-8. Nuts 30–33 press the saw blades 1 and 2, and the gears 16 and 18 to their axial working positions. The saw blades travel along suitably formed splines 34 and 35, to achieve a desired mutually angled relationship. In a normal position, the saw blades are pressed together and the teeth fronts are superimposed, see the broken lines at 6 and 7 in FIG. 5. The axial outer parts of the rotary system secure the bearings 36 and 37. These bearings have been electrically isolated from the electric circuitry by means of conventional isolating rings 38 and 39. The rings also have contact with flanges or shoulders of the shaft to provide the system with an axial stability.

By suitably designing the electrical system, no electrical voltage of the saw blades relative to the surrounding will occur under balanced conditions of the electrical bridge 26A.

Alternatively, however, the connecting contact 40 of the inductor 25 can be grounded (FIG. 4). Then, the useful electrical power from the generator will be concentrated only at the cutting area.

Another possible alternative (not shown) of the invention involves connecting the blade and shaft units 1, 2 and 3 of FIG. 4 directly to one another for common rotation by a directly-coupled motor (such as motor 11). The two force-sensors, 19a and 19b would be replaced by a single force-sensor, which is mounted on the frame for measuring axial pressure on the shaft-system. The parts 1, 2, 3 of the system would be arranged with a smaller axial clearance and initially biased with a constant force in the axial direction towards the force-sensor by a spring for example. This permits a smaller overall blade-thickness at a maintained stiffness.

Figure 6:
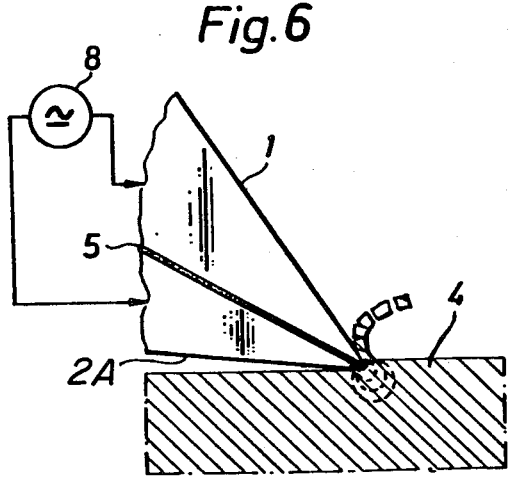
FIG. 6 is a side elevational view of another type of cutting tool according to the present invention.

An embodiment of the invention depicted in FIG. 6 involves a double-wedge 1A, 2A to be used for planing, milling, veneering cutting, etc., i.e., when smaller amounts (e.g., a surface layer) of the workpiece are to be removed. Two wedge parts 1A and 2A are arranged to form a single cutting unit but can be relatively displaced in a direction perpendicular or parallel to the cutting direction to achieve desired cutting effects, for example by compensating for cutter wear or varying of the texture in the workpiece, etc. The wedge parts 1A, 2A are electrically insulated by the insulating material 5 to achieve a current across their cutting tips in the afore-discussed manner.

Figure 7:
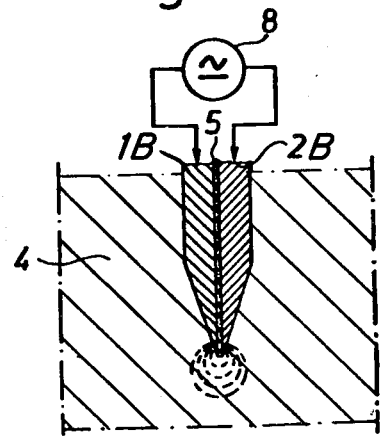
FIG. 7 is a front view of a further type of cutting tool according to the present invention.

FIG. 7 shows an embodiment of the invention for achieving dust-free cutting of a material. The wedge-halves 1B and 2B can be displaced relatively to each other in directions perpendicular or parallel to the cutting direction. Also, the cutters can be vibrated without a significant loss in side-stability, since the concentrated heat production will decrease the cutting work and thus decrease the side-force effects.

In FIGS. 1-3 and FIGS. 6-7, the electrical power-generator 8 has not been described in detail since it is of well-known construction.

The embodiments of the invention depicted and described herein are only exemplary. They must be seen as examples which may be modified and thus cannot be seen as limiting the scope of the invention. The actual construction of the particular embodiments may be different and the different application areas for cutting tools according to the invention are vast. Examples of other application areas are metal working, medical surgery, cutting of deep-frozen products, surface grinding, etc.

What is claimed is:

1. A cutting tool comprising at least two spaced cutting edges, means electrically isolating said cutting edges from each other, and means connecting said cutting edges to an electrical voltage source for creating a current between the cutting edges and within a workpiece being cut, to heat the workpiece at the cutting area, each cutting edge comprising a tooth of a blade, each blade having a plurality of said teeth, the teeth of one blade being offset from the teeth of the other blade, said blades being electrically isolated from each other.

2. A cutting tool according to claim 1, wherein each cutter comprises a circular saw.

3. A cutting tool according to claim 1, wherein each cutting edge is of wedge-shaped configuration.

4. A cutting tool according to claim 1 including an electrical circuitry connected to said voltage source and to a third pole interposed between said cutting edges to induce a current flow therebetween.

5. A cutting tool according to claim 1 including means for varying the voltage across said cutting edges.

6. A cutting tool according to claim 1, wherein said blades are configured in mirror-image to produce equally opposing side forces which press said blades together.

7. A cutting tool according to claim 1, wherein said cutting edges comprise a pair of wedges which are oriented to define a single unit.

8. A cutting tool according to claim 7, wherein said wedges are relatively displaceable in directions perpendicular to the direction of cut.

9. A cutting tool according to claim 7, wherein said wedges are relatively displaceable parallel to the cutting direction.

* * * * *